United States Patent
Awane et al.

(10) Patent No.: US 8,450,981 B2
(45) Date of Patent: May 28, 2013

(54) POWER CONVERSION APPARATUS

(75) Inventors: Kazutoshi Awane, Chiyoda-ku (JP);
Masaki Yamada, Chiyoda-ku (JP);
Takashi Kaneyama, Chiyoda-ku (JP);
Ryota Kondo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 13/101,293

(22) Filed: May 5, 2011

(65) Prior Publication Data
US 2012/0106218 A1    May 3, 2012

(30) Foreign Application Priority Data

Nov. 1, 2010  (JP) ................. 2010-244916

(51) Int. Cl.
*H02J 7/04* (2006.01)
*H02J 7/00* (2006.01)
(52) U.S. Cl.
USPC ........... 320/140; 320/132; 320/127; 320/128; 320/142; 320/152
(58) Field of Classification Search
CPC .................................................. H02J 7/022
USPC ....................................................... 320/140
See application file for complete search history.

(56) References Cited

U.S. PATENT DOCUMENTS

| 7,796,410 | B2 | 9/2010 | Takayanagi et al. |
| 2008/0174291 | A1* | 7/2008 | Hansson et al. ............. 323/283 |
| 2011/0127838 | A1 | 6/2011 | Awane et al. |

FOREIGN PATENT DOCUMENTS

| JP | 2006-304430 | * 11/2006 |
| JP | 2006-304430 A | 11/2006 |
| JP | 2008-118727 A | 5/2008 |
| JP | 2009-095160 A | 4/2009 |
| JP | 2010-124549 A | 5/2010 |
| JP | 2011-114972 A | 6/2011 |
| JP | 2011-147198 A | 7/2011 |
| JP | 2011-229261 A | 11/2011 |

OTHER PUBLICATIONS

Japanese Office Action issued in corresponding Japanese Patent Application No. 2010-244916 dated Oct. 23, 2012.

* cited by examiner

*Primary Examiner* — Edward Tso
*Assistant Examiner* — Ahmed Omar
(74) *Attorney, Agent, or Firm* — Sughrue Mion, PLLC

(57) ABSTRACT

In order to widen an operational input voltage range of a power conversion apparatus and obtain a maximum efficiency value comparable to that in a case where the operational input voltage range is not widened by changing software but not hardware, provided is a power conversion apparatus, in which a control section (5) controls a current input to an inverter circuit (14) to cause a DC output voltage from an AC/DC converter section (10) which is a voltage across a smoothing capacitor (22) to follow a target voltage and to cause an input power factor from an AC power supply (1) to approach one, to thereby maintain a DC voltage from a single-phase inverter (14*a*), and adjusts the target voltage for the DC output voltage from the AC/DC converter section (10) in accordance with a voltage of the AC power supply (1).

5 Claims, 15 Drawing Sheets

$V_{dc\_ideal}$: OUTPUT VOLTAGE IDEAL VALUE $V_{sub\_ideal}$: IDEAL VALUE OF TARGET VOLTAGE OF DC VOLTAGE SOURCE $V_{sub\_ideal}$ : IDEAL VALUE OF TARGET VOLTAGE OF DC VOLTAGE SOURCE $V_{sub\_margin}$ : $V_{sub}$ MARGIN COEFFICIENT

POWER CONVERSION APPARATUS

BACKGROUND OF THE INVENTION

1. Field of the Invention

The present invention relates to a power conversion apparatus which includes a high-power factor converter for converting an alternating current (AC) voltage into a direct current (DC) voltage and an insulated DC/DC converter provided in a subsequent stage thereof.

2. Description of the Related Art

A conventional power conversion apparatus includes an AC/DC converter section for controlling a power factor of a commercial AC power supply to perform AC/DC conversion and a DC/DC converter section which is provided in a subsequent stage of the AC/DC converter section and insulated by a transformer (see, for example, Japanese Patent Application Laid-open No. 2008-118727).

For example, in the conventional power conversion apparatus described above, in order to charge a DC power supply 1 and a DC power supply 2 which are insulated from each other, a primary-side switching circuit of the DC/DC converter section is switched while an ON duty of a semiconductor switching element is fixed or variable. In this case, the duty is determined based on which of the DC power supply 1 and the DC power supply 2 is preferentially charged, but is not determined in accordance with an output voltage and current. Therefore, when a primary-side ON duty of the DC/DC converter section is to be fixed, it is necessary to provide an additional switching means (bidirectional switching means in Japanese Patent Application Laid-open No. 2008-118727) on a secondary side. However, there is a problem that control is complicated and a loss of the DC/DC converter section increases.

SUMMARY OF THE INVENTION

The present invention is not limited to an apparatus for charging two DC power supplies, for example, the conventional power conversion apparatus as described above. An object of the present invention is to provide a power conversion apparatus which includes an AC/DC converter section and a DC/DC converter section which is provided in a subsequent stage of the AC/DC converter section and insulated by a transformer, in which a target value of an output voltage of the AC/DC converter section is generated in accordance with output voltage and current values to reduce a power loss and noise of the power conversion apparatus and to eliminate a large current-limiting circuit for a reduction in size, and with which, particularly, an operational input voltage range of the power conversion apparatus is widened and a maximum efficiency value comparable to that in a case where the operational input voltage range is not widened is obtained by changing software but not hardware.

The present invention provides a power conversion apparatus, including: an AC/DC converter section for converting AC power from an AC power supply into DC power; a DC/DC converter section for converting an output from the AC/DC converter section into predetermined DC power for output; and a control section for performing switching control on switches provided at predetermined parts in accordance with detection signals input from a voltage detection circuit and a current detection circuit provided at predetermined parts of the AC/DC converter section and a voltage detection circuit and a current detection circuit provided at predetermined parts of the DC/DC converter section, in which the AC/DC converter section includes: an inverter circuit in which at least one single-phase inverter having a DC voltage source and a plurality of semiconductor switching elements for charging and discharging the DC voltage source is connected in series; a rectifier element provided in a subsequent stage of the inverter circuit; a smoothing capacitor which is connected to the inverter circuit through the rectifier element, for smoothing an output from the inverter circuit for output; and a short-circuit switch for causing a current to bypass the smoothing capacitor, and in which the control section controls a current input to the inverter circuit to cause a DC output voltage from the AC/DC converter section which is a voltage across the smoothing capacitor to follow a target voltage and to cause an input power factor from the AC power supply to approach one, to thereby maintain a DC voltage from the at least one single-phase inverter, and adjusts the target voltage for the DC output voltage from the AC/DC converter section in accordance with a voltage of the AC power supply.

According to the present invention, the operational input voltage range of the power conversion apparatus may be widened and the maximum efficiency value comparable to that in the case where the operational input voltage range is not widened may be obtained by changing software but not hardware. The hardware is not changed, and hence a design period of the hardware may be significantly shortened and common parts are easily used for power conversion apparatus having different input voltage ranges. Therefore, the improvement of availability of parts and the reduction in part cost are expected because of the advantages of scale.

DETAILED DESCRIPTION OF THE PREFERRED EMBODIMENTS

Figure 1:
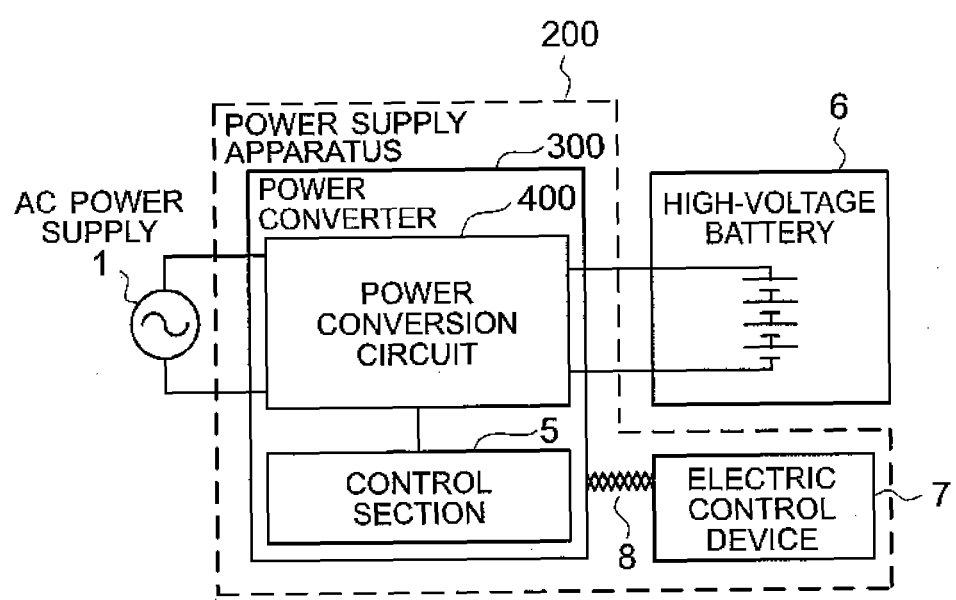
FIG. 1 is a block structural diagram illustrating a power conversion apparatus according to the present invention, serving as a power supply apparatus.

The inventors of the present invention firstly studied a power conversion apparatus in which a target value of an output voltage of an AC/DC converter section is generated in accordance with output voltage and current values to improve the efficiency of the power conversion apparatus, in which the AC/DC converter section is provided, between an input AC power supply and a DC link section, with a unit in which at least one single-phase inverter including a semiconductor switching element and a DC voltage source is connected in series, to reduce a power loss and a noise, and in which a large current-limiting circuit is removed to reduce a size of an apparatus structure.

In the power conversion apparatus as described above, the AC/DC converter section is provided with the unit including the above-mentioned single-phase inverter to control a duty to maximize the efficiency of a DC/DC converter section while a variable range of the target value of the output voltage of the AC/DC converter section is widened. However, it is necessary to set a holding voltage of the single-phase inverter to a high value depending on a relationship between an AC input voltage of the AC/DC converter section and a DC output voltage of the DC/DC converter section. Therefore, there may be a case where the efficiency of the AC/DC converter section degrades to reduce the efficiency of the entire power conversion apparatus.

For example, assume that a power conversion apparatus B with a widened input voltage range is to be designed based on a power conversion apparatus A which is a design source. In this case, when an input voltage of the power conversion apparatus B is higher than an input voltage of the power conversion apparatus A and a lower limit of the output voltage of the AC/DC converter section is low, the holding voltage of the single-phase inverter is required to be set to a value higher than a design value of the power conversion apparatus A. Therefore, when a withstand voltage of the switching element of the single-phase inverter is insufficient, a circuit modification is required, and hence a design time lengthens and parts cannot be used in common. A high-withstand voltage switching element is generally larger in loss than a low-withstand voltage switching element, and hence a maximum efficiency value reduces. In addition, a lineup (models or types) of parts for a specific application (for example, mounting on vehicle) is smaller in number than a lineup of general purpose parts and there is not an element suitable for the specific application in some cases, and hence the difficulty level of design becomes higher.

Therefore, the present invention has been made in view of particularly the points described above. In a power conversion apparatus according to the present invention, an AC/DC converter section includes an inverter circuit in which at least one single-phase inverter including a plurality of semiconductor switching elements and a DC voltage source is connected in series, a smoothing capacitor which is connected to a subsequent stage side of the inverter circuit through a rectifier element to smooth an output of the rectifier element, and a short-circuit switch for bypassing the smoothing capacitor. Further, the AC/DC converter section controls an output of the inverter circuit in accordance with a current command to cause a voltage of the smoothing capacitor to follow a target voltage and to improve an input power factor from an input AC power supply. An operational input voltage range of the power conversion apparatus is widened and a maximum efficiency value comparable to that in a case where the operational input voltage range is not widened is obtained by changing hardware but not software.

Hereinafter, a power conversion apparatus according to embodiments of the present invention is described with reference to the attached drawings. In each of the embodiments, the same or corresponding sections are expressed by the same reference symbols and thus the duplicated description is omitted.

First Embodiment

FIG. 1 is a block structural diagram illustrating a power conversion apparatus according to the present invention, serving as a power supply apparatus. FIG. 1 illustrates an example in which the power conversion apparatus is used as a power supply apparatus 200 to which an AC voltage source 1 (hereinafter, referred to simply as AC power supply 1) is connected on an input side thereof to charge a high-voltage battery 6 connected to an output side thereof. The power supply apparatus (power conversion apparatus) 200 includes a power converter 300 and an electric control device 7. The power converter 300 includes a power conversion circuit 400 and a control section 5.

The power conversion circuit 400 is a circuit for performing power conversion by switching, which receives input power from the AC power supply 1 and charges the high-voltage battery 6 connected to the output stage. Detection circuits (see FIG. 2) attached to predetermined portions of the power conversion circuit 400 send detected currents and voltages to the control section 5 through signal lines.

The control section 5 receives an output power command from the electric control device 7 through a communication line 8, generates a target power signal $P_{out}^*$ used in switching control in accordance with the output power command, and performs pulse width modulation (PWM) control on switching elements (see FIG. 2) of the power conversion circuit 400 to follow the target power signal $P_{out}^*$.

The high-voltage battery 6 is a chargeable and dischargeable battery, for example, a lithium ion battery, and charged by supplying a current to a positive side thereof. The electric control device 7 is a high-level control unit of the power supply apparatus 200 and transmits the output power command to the power converter 300 through the communication line 8. The communication line 8 is a signal transmission line for communicating between the power converter 300 and the electric control device 7 using a communication protocol, for example, a controller area network (CAN) protocol (see ISO11898 and ISO11519-2). Each of the control section 5 and the electric control device 7 includes a microcomputer or a computer.

Figure 2:
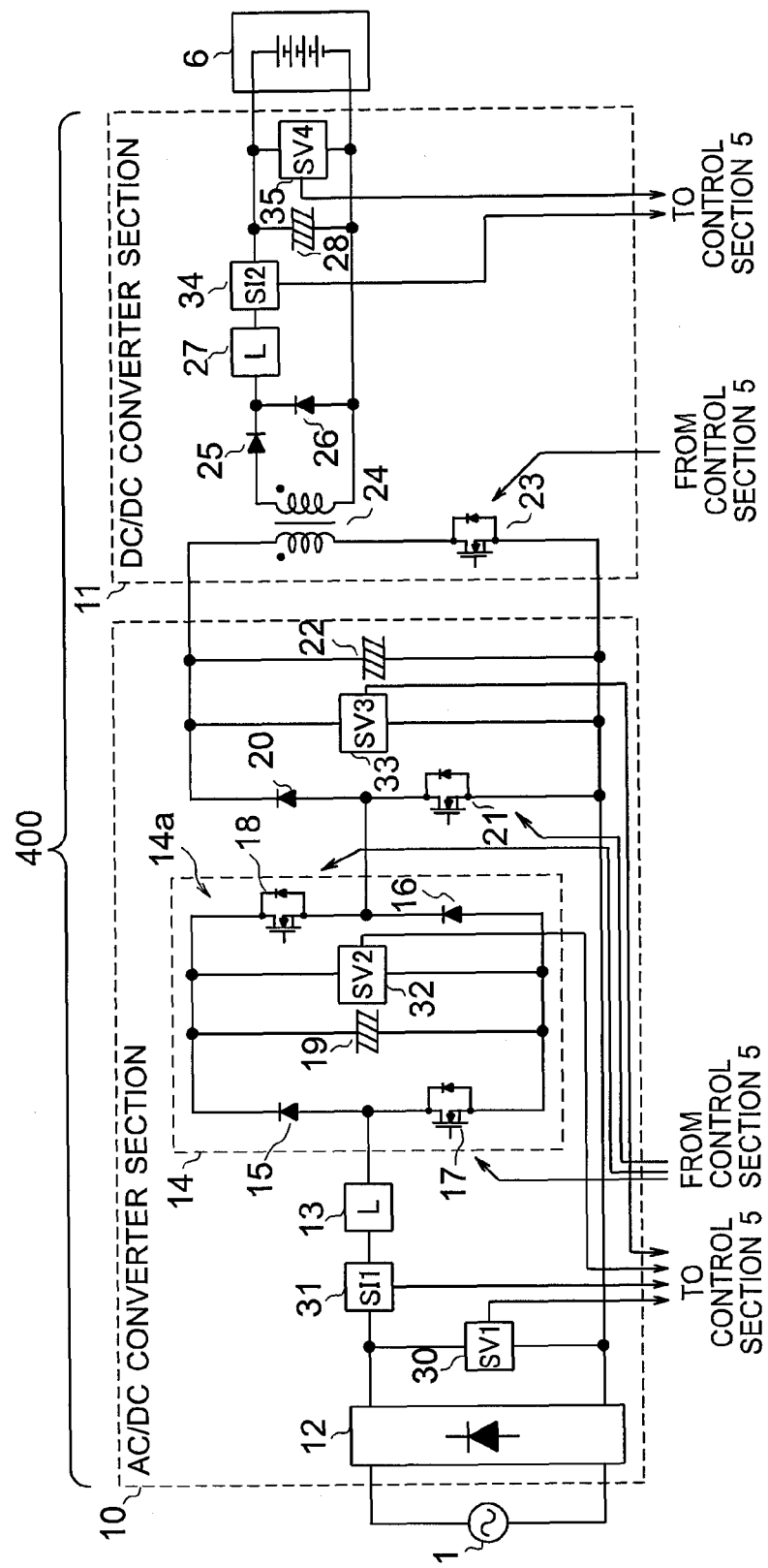
FIG. 2 is a schematic structural diagram illustrating an example of an internal structure of a power conversion circuit in a first embodiment of the present invention.

FIG. 2 is a schematic structural diagram illustrating an example of an internal structure of the power conversion circuit 400 illustrated in FIG. 1 in the first embodiment of the present invention. An AC/DC converter section 10 includes elements from a diode bridge 12 to a smoothing capacitor 22. The diode bridge 12 receives an AC voltage from the AC power supply 1. The AC power supply 1 is connected to the diode bridge 12 serving as a rectifier circuit. The diode bridge 12 is connected in parallel to a rectified voltage detection circuit (SV1) 30. A series circuit in which a rectified current detection circuit (SI1) 31 and a reactor (L) 13 serving as a current limiting circuit are connected in series to each other is connected in series to an output side of the diode bridge 12. A subsequent stage side of the reactor 13 is connected in series to an AC side of an inverter circuit 14 serving as one single-phase inverter.

The inverter circuit 14 includes one single-phase inverter 14a which has two single-phase inverter switches (semiconductor switching elements) 17 and 18, two diodes 15 and 16, and a DC voltage source 19 (including DC voltage source voltage detection circuit 32 in an actual case). Each of the single-phase inverter switches 17 and 18 includes a diode and an insulated gate bipolar transistor (IGBT) which are connected in reverse parallel, or a metal oxide semiconductor field effect transistor (MOSFET) containing a diode between a source and a drain. The DC voltage source 19 is connected in parallel to the DC voltage source voltage detection circuit 32.

The DC voltage source 19 and the DC voltage source voltage detection circuit (SV2) 32 are connected in common between both ends of a series circuit in which the single-phase inverter switch 17 is connected to an anode side of the diode 15 and between both ends of a series circuit in which a cathode side of the diode 16 is connected to the single-phase inverter switch 18. A connection point between the single-phase inverter switch 17 and the anode side of the diode 15 is connected to the reactor 13. A connection point between the cathode side of the diode 16 and the single-phase inverter switch 18 is connected to a circuit located in a subsequent stage.

The inverter circuit 14 is connected to a series circuit which is located in the subsequent stage and includes a short-circuit switch 21 and a rectifier diode 20. A cathode side of the rectifier diode 20 is connected to a positive electrode of a smoothing capacitor 22 of the AC/DC converter section 10 located in an output stage. A connection point between one end of the short-circuit switch 21 and an anode side of the rectifier diode 20 is connected to an AC output line of the inverter circuit 14. The other end of the short-circuit switch 21 is connected to a negative electrode of the smoothing capacitor 22. The smoothing capacitor 22 is connected in parallel to a smoothing capacitor voltage detection circuit (SV3) 33.

The DC/DC converter section 11 includes elements located between a subsequent stage of the smoothing capacitor 22 and a previous stage of the high-voltage battery 6. A general forward converter circuit is used as the DC/DC converter section. The smoothing capacitor 22 is connected in parallel to a series circuit including a primary coil of a transformer 24 and a forward converter switch 23 in the subsequent stage of the smoothing capacitor 22. A secondary coil of the transformer 24 is connected in series to a secondary rectifier series diode 25 and in parallel to a secondary rectifier parallel diode 26. A smoothing reactor (L) 27 and an output current detection circuit (SI2) 34 are connected in order in series in a subsequent stage of the diodes 25 and 26 for secondary rectification. Further, a capacitor 28 is connected in parallel. A voltage across the capacitor 28 corresponds to an output of the DC/DC converter section 11. The high-voltage battery 6 which is a load is connected between both the ends of the capacitor 28. The high-voltage battery 6 (capacitor 28) is connected in parallel to an output voltage detection circuit (SV4) 35.

Detection signals indicating results obtained by detection by the respective detection circuits 30 to 35 are sent to the control section 5 through the signal lines. Control signals are sent from the control section 5 to the respective switches 17, 18, 21, and 23 through signal lines. In order to simplify the structures of the circuits, the signal lines are omitted in FIG. 3 and the subsequent figures.

Figure 3:
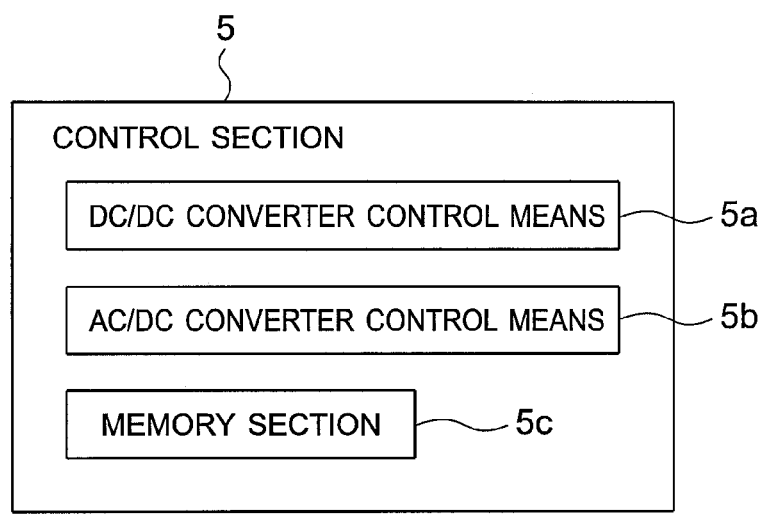
FIG. 3 is a schematic functional block diagram illustrating a control section (5) illustrated in FIG. 1.

FIG. 3 is a schematic functional block diagram illustrating the control section 5 illustrated in FIG. 1. The control section 5 substantially includes: DC/DC converter control means 5a and AC/DC converter control means 5b which are implemented by software; and a memory section 5c implemented by hardware, for storing programs for the control means 5a and 5b and various factors required for control in advance and storing or updating various values which are calculated during control and required to be stored. The DC/DC converter control means 5a and the AC/DC converter control means 5b are operated for control in conjunction with each other.

Figure 4:
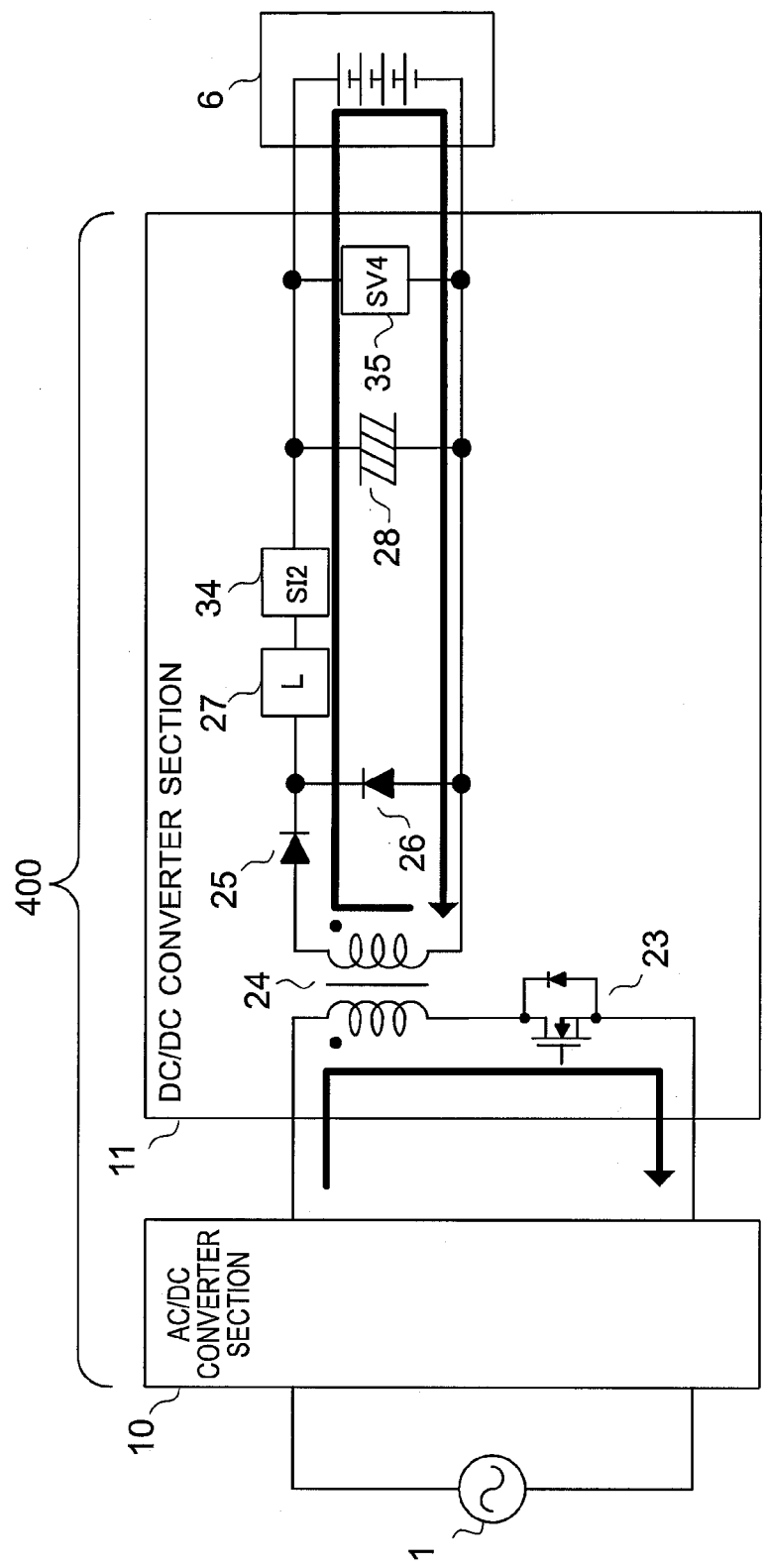
FIG. 4 is a schematic structural diagram illustrating an operation of a DC/DC converter section illustrated in FIG. 2.
Figure 5:
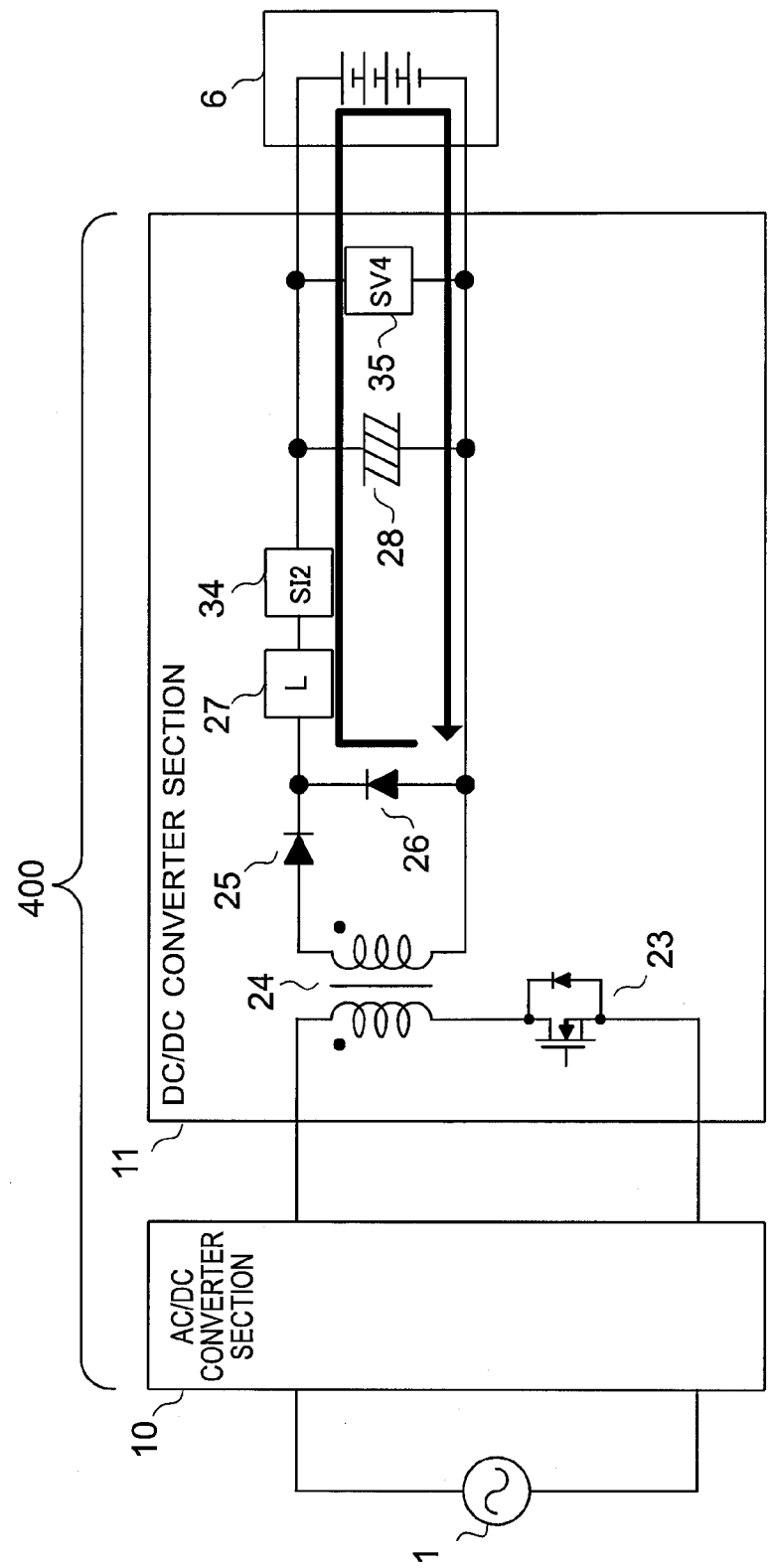
FIG. 5 is a schematic structural diagram illustrating the operation of the DC/DC converter section illustrated in FIG. 2.

Firstly, an operation of the DC/DC converter section 11 of the power converter 300 having the structure as described above is described. FIGS. 4 and 5 are schematic structural diagrams illustrating the operation of the DC/DC converter section 11 of the power conversion circuit 400 illustrated in FIG. 2 under the control of the DC/DC converter control means 5a illustrated in FIG. 3. In the following description, the DC/DC converter section 11 is assumed as a general insulated forward converter.

Symbols are defined as follows.
$P_{out}^*$: Control target power value generated by control section 5
$I_{out}$: Output current of DC/DC converter section 11 which is detected by output current detection circuit 34
$I_{out}^*$: Control target current value of output current $I_{out}$
$V_{out}$: Output voltage of DC/DC converter section 11
$V_{load}$: Load voltage detected by output voltage detection circuit 35
$V_{tr2}$: Secondary voltage of transformer 24

When the forward converter switch 23 is turned "ON", as illustrated in FIG. 4, a current flowing into the primary coil of the transformer 24 flows through a path including the AC/DC converter section 10, the primary coil of the transformer 24, and the forward converter switch 23 in this order. The transfer 24 transfers power from the primary side to the secondary side. A current flowing into the secondary coil of the transformer 24 flows through a path including the secondary coil of the transformer 24, the secondary rectifier series diode 25, the smoothing reactor 27, and the high-voltage battery 6 in this order (described except for various detection circuits, the same applies hereinafter).

When the forward converter switch 23 is turned "OFF", as illustrated in FIG. 5, a current does not flow into the primary coil of the transformer 24, and hence power is not transferred to the secondary side. However, on the secondary side, a current flows through a path including the smoothing reactor 27, the high-voltage battery 6, and the secondary rectifier parallel diode 26 in this order because of the self-induction of the smoothing reactor 27.

Symbols are defined as follows.
N1: the number of turns of primary coil of transformer 24
N2: the number of turns of secondary coil of transformer 24
ton: ON time of forward converter switch 23
T: ON/OFF switching period of forward converter switch 23
$V_{dc}$: voltage of smoothing capacitor 22 which is detected by smoothing capacitor voltage detection circuit 33

In this case, the output voltage $V_{out}$ of the DC/DC converter section 11 may be expressed by Expression (1) described below.

$$V_{out} = (N2/N1) \cdot V_{dc} \cdot (ton/T) \quad (1)$$

Therefore, the output voltage $V_{out}$ of the DC/DC converter section 11 may be controlled in accordance with the ON time ton of the forward converter switch 23. That is, the forward converter switch 23 is PWM-controlled to control the output voltage $V_{out}$ of the DC/DC converter section 11, to thereby adjust the output current $I_{out}$ flowing into the high-voltage battery 6. In this manner, an output following the target power value $P_{out}*$ is obtained. Note that, the load voltage $V_{load}$ detected by the output voltage detection circuit 35 is fixed to the voltage value of the high-voltage battery 6. Thus, in this embodiment, the load voltage $V_{load}$ is different from the output voltage $V_{out}$.

Figure 6:
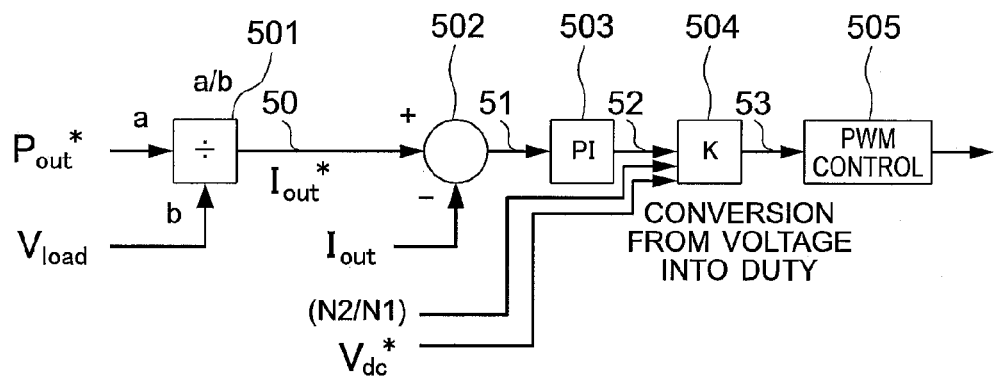
FIG. 6 is a control block diagram illustrating control of a forward converter switch illustrated in FIG. 2.

The control of the control section 5 for causing the output power to follow the target power value $P_{out}*$ is described in detail below. FIG. 6 is a control block diagram illustrating the control of the forward converter switch 23 which is performed by the DC/DC converter control means 5a of the control section 5. Firstly, the target power value $P_{out}*$ is divided by the load voltage $V_{load}$ by a dividing section 501 to obtain a control target current value $I_{out}*$ 50. In this embodiment, the high-voltage battery 6 is provided as the load. When it is assumed that an increase in voltage of the high-voltage battery 6 during charging is sufficiently slow and an internal resistance thereof is very small, the load voltage $V_{load}$ may be assumed to be substantially constant. Therefore, the control target current value $I_{out}*$ 50 may be obtained as described above.

Next, a difference 51 between the output current $I_{out}$ and the target current value $I_{out}*$ 50 is obtained by a subtracting section 502. Then, an output obtained by PI control (control method of performing proportional (P) operation and integral (I) operation in combination on difference) using the difference 51 as a feedback amount by a PI control section (PI) 503 is determined as a target output voltage value $V_{out}*$ 52 of the output voltage $V_{out}$ of the DC/DC converter section 11. A PWM duty 53 for generating the target output voltage value $V_{out}*$ 52 of the output voltage $V_{out}$ is obtained by a duty calculation section (K) 504 using Expression (1) described above based on a winding ratio (N2/N1) of the transformer 24 and a target output voltage value $V_{dc}*$ of the DC voltage $V_{dc}$ of the smoothing capacitor 22. A method of calculating the target output voltage value $V_{dc}*$ is described later. A driving signal for the forward converter switch 23 is generated by a PWM control section 505 based on the PWM duty 53 to drive the DC/DC converter section 11.

Figure 7:
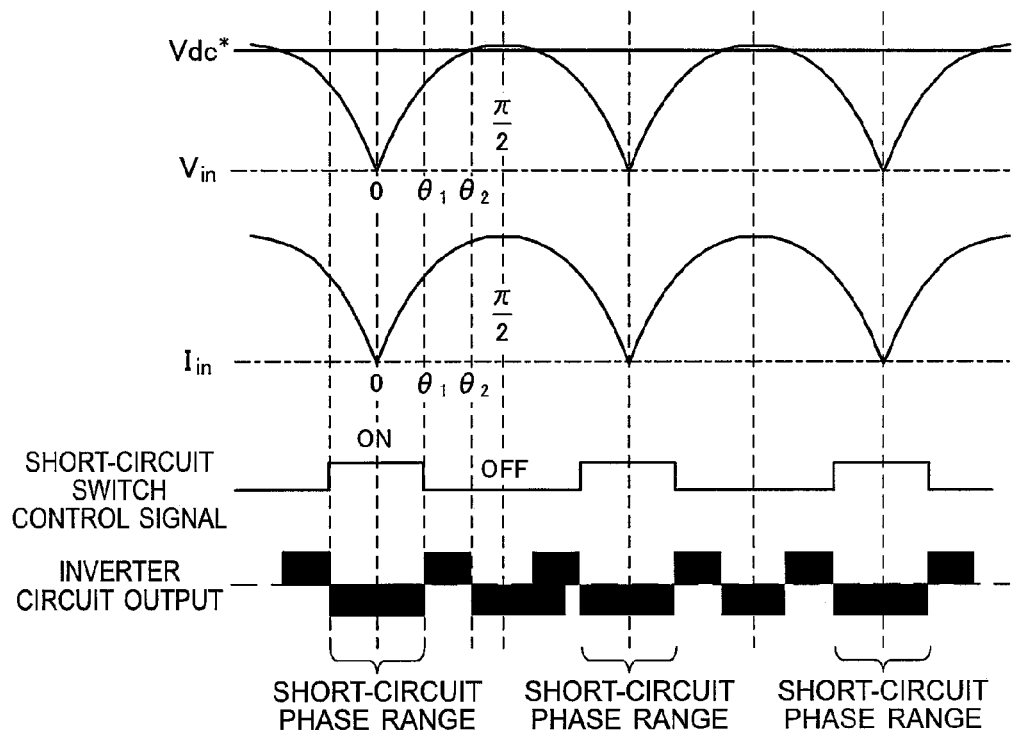
FIG. 7 illustrates respective waveforms in respective parts of an AC/DC converter section.

Next, an operation of the AC/DC converter section 10 under the control of the AC/DC converter control means 5b illustrated in FIG. 3 is described. FIG. 7 illustrates waveforms in the respective parts of the AC/DC converter section 10.

Symbols are defined as follows.

$V_{in}$: voltage from diode bridge, which is detected by rectified voltage detection circuit 30

$I_{in}$: current from diode bridge, which is detected by rectified current detection circuit 31

$V_{sub}$: voltage of DC voltage source 19 included in inverter circuit 14, which is detected by DC voltage source voltage detection circuit 32

$V_{sub}*$: control target voltage value of DC voltage source 19 included in inverter circuit 14

$V_{dc}$: voltage value of smoothing capacitor 22 which is detected by smoothing capacitor voltage detection circuit 33

$V_{dc}*$: control target voltage value of smoothing capacitor 22

θ: input voltage phase of AC power supply 1

An input from the AC power supply 1 is full-wave rectified by the diode bridge 12, and hence the voltage $V_{in}$ and the current $I_{in}$ in a subsequent stage of the diode bridge 12 have waveforms as illustrated in FIG. 7. In this case, assume that a peak voltage of the voltage $V_{in}$ is higher than the DC voltage $V_{dc}$ of the smoothing capacitor 22 which is controlled to the constant target voltage value $V_{dc}*$.

The inverter circuit 14 controls the current $I_{in}$ for output, under PWM control so that an input power factor from the AC power supply 1 is equal to substantially one or one. Therefore, a voltage generated between an AC side connection point and a DC side connection point is superimposed on the voltage $V_{in}$ in the subsequent stage of the diode bridge 12.

Figure 8:
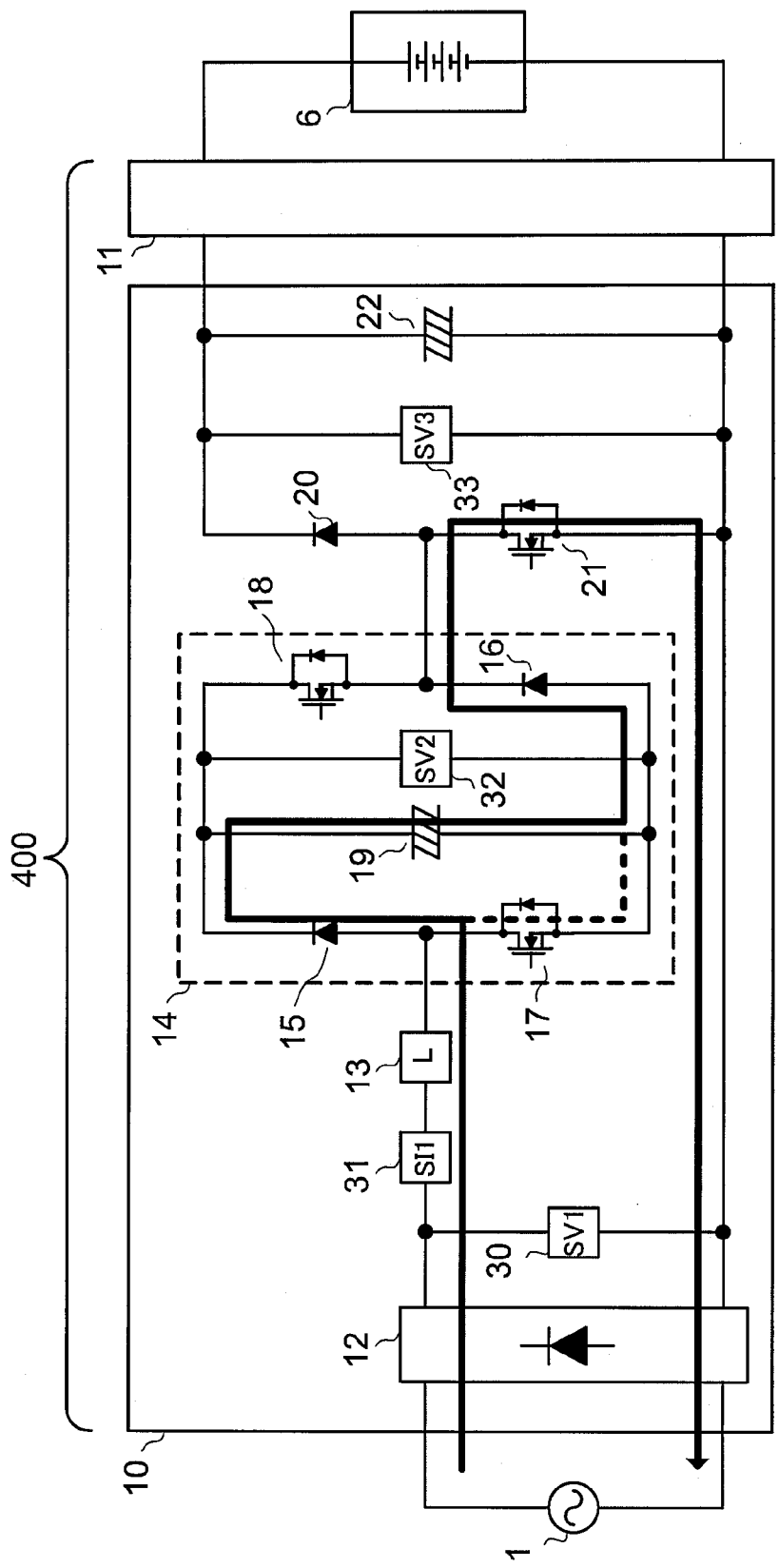
FIG. 8 illustrates a flow of current caused by ON/OFF control of single-phase inverter switches included in an inverter circuit.
Figure 9:
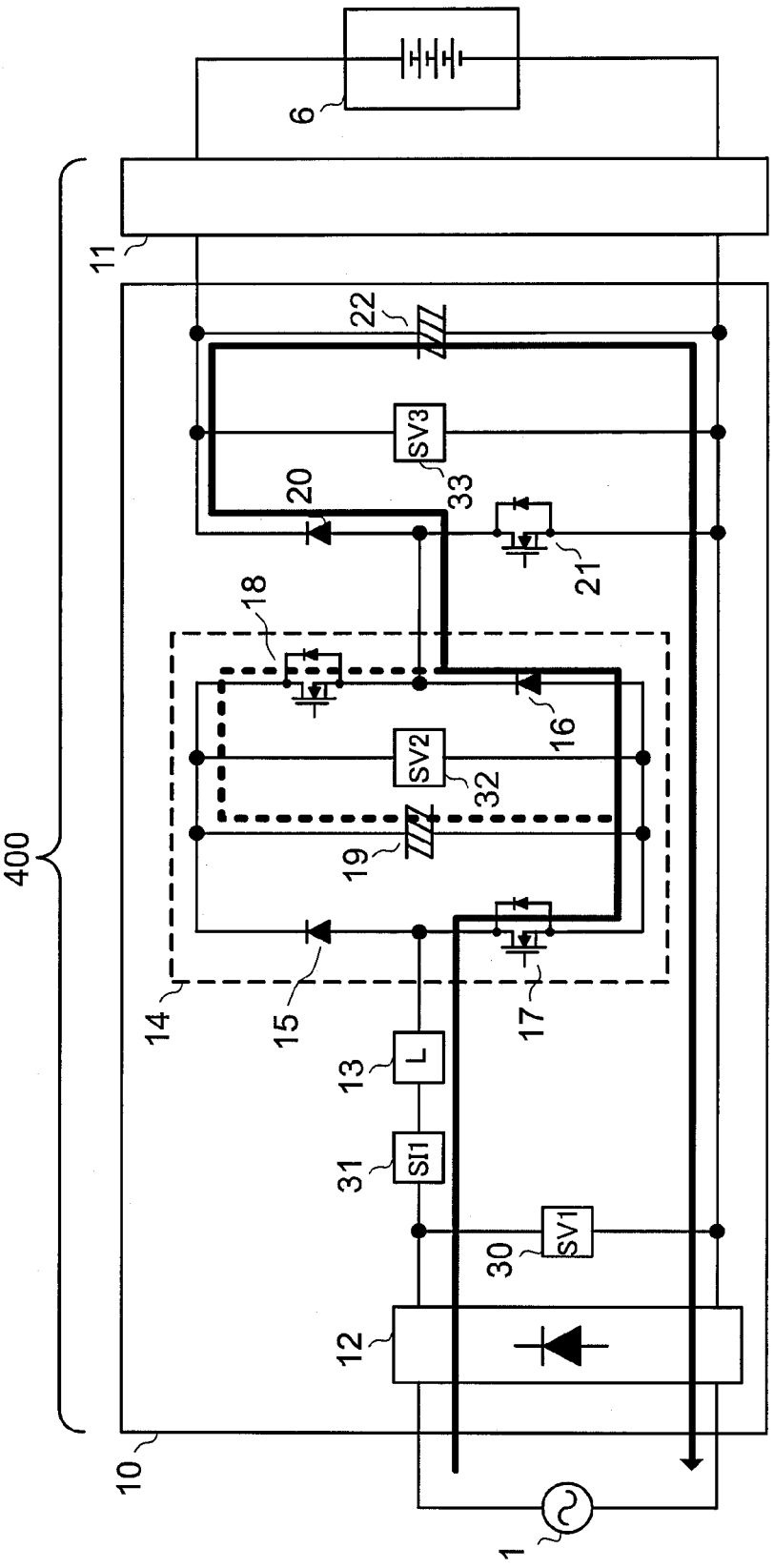
FIG. 9 illustrates a flow of current caused by the ON/OFF control of the single-phase inverter switches included in the inverter circuit.
Figure 10:
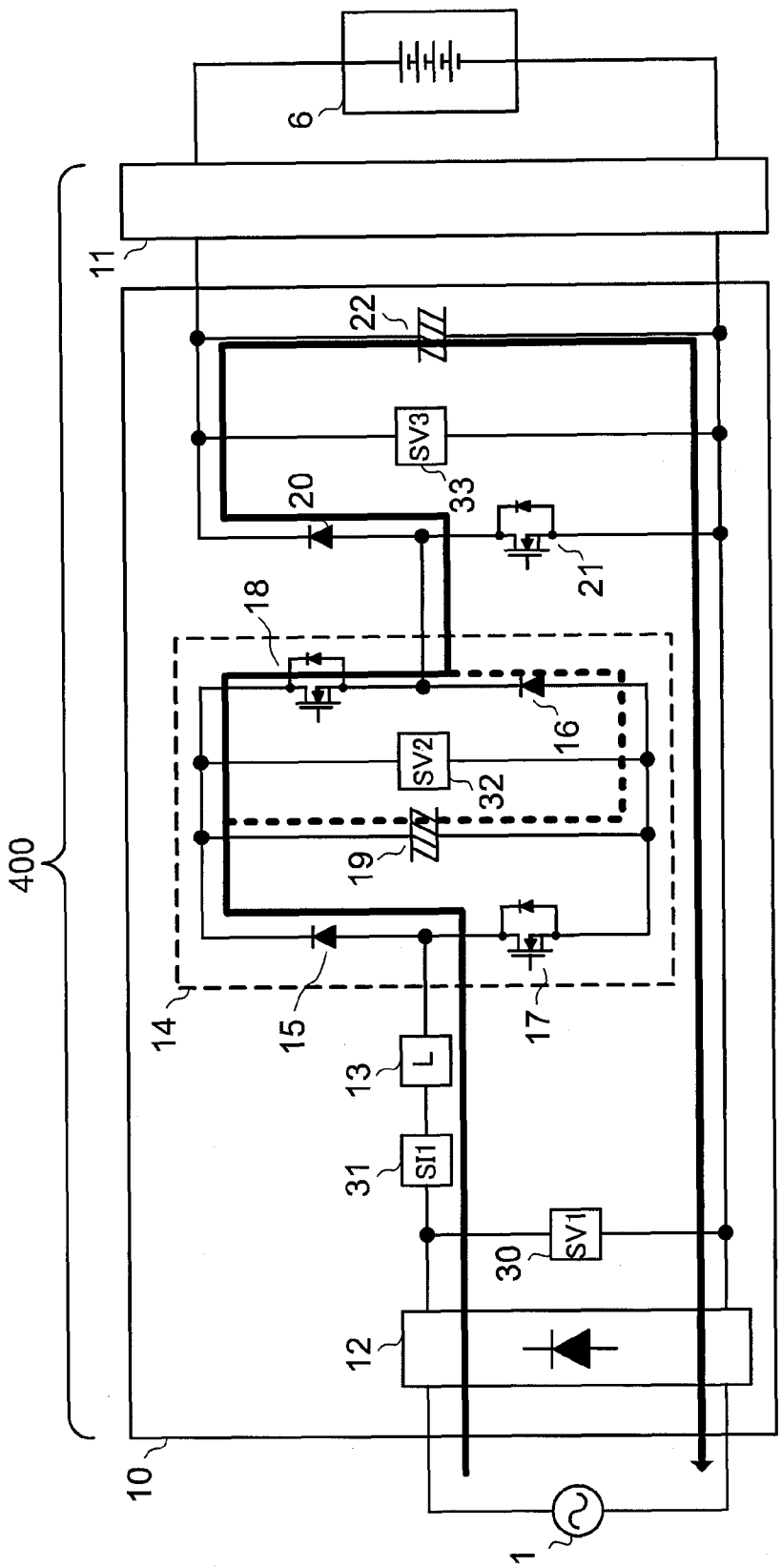
FIG. 10 illustrates a flow of current caused by the ON/OFF control of the single-phase inverter switches included in the inverter circuit.

FIGS. 8 to 10 illustrate the flows of current caused by ON/OFF control of the single-phase inverter switches 17 and 18 included in the inverter circuit 14.

When the single-phase inverter switches 17 and 18 are turned "OFF", a current flows through the diode 15 to charge the DC voltage source 19, flows through the diode 16, and is then output from the inverter circuit 14 (see, for example, solid line of FIG. 8 and broken line of FIG. 10).

When only the single-phase inverter switch 17 is turned "ON", a current flows through the single-phase inverter switch 17 and the diode 16, and is then output from the inverter circuit 14 (see, for example, broken line of FIG. 8 and solid line of FIG. 9).

When only the single-phase inverter switch 18 is turned "ON", a current flows through the diode 15 and the single-phase inverter switch 18, and is then output from the inverter circuit 14 (see, for example, solid line of FIG. 10).

When the single-phase inverter switches 17 and 18 are turned "ON" at the same time, a current flows through the single-phase inverter switch 17 to discharge the DC voltage source 19, flows through the single-phase inverter switch 18, and is then output from the inverter circuit 14 (see, for example, flow in broken line region illustrated in FIG. 9).

The four control types as described above are used in combination to control the single-phase inverter switches 17 and 18, to thereby PWM-control the inverter circuit 14.

For example, the AC/DC converter control means 5b performs control based on a phase θ relative to a zero cross point of the input voltage $V_{in}$ from the diode bridge 12, which is obtained from a detection signal output from the rectified voltage detection circuit 30. As illustrated in FIG. 7, assume that the input voltage phase from the AC power supply 1 is denoted by θ, the phase θ when the voltage $V_{in}$ is equal to the target voltage value $V_{dc}*$ of the smoothing capacitor 22 is denoted by θ2 (0<θ2<π/2), and the short-circuit switch 21 is in an ON state while the phase θ is in a range of 0 to a predetermined phase θ1 (0<θ1<θ2), that is, 0≦θ<θ1. In this case, as illustrated in FIG. 8, the current from the AC power supply 1 flows through a path including the diode bridge 12, the reactor 13, the inverter circuit 14, the short-circuit switch 21, and the diode bridge 12 in this order, to thereby return to the AC power supply 1. The short-circuit switch 21 is in the "ON" state, and hence a current does not flow through the rectifier diode 20 and the smoothing capacitor 22. For example, in a combination of the case where the single-phase inverter switches 17 and 18 are turned "OFF" (current flow indicated by solid line of FIG. 8) and the case where only the single-phase inverter switch 17 is turned "ON" (current flow indicated by broken line of FIG. 8), the inverter circuit 14 controls the current $I_{in}$ for output, under the PWM control so that the input power factor is equal to substantially one or one while a voltage which has an opposite polarity to the voltage $V_{in}$ and is substantially equal to or equal to the voltage $V_{in}$ is generated. During the control of the current $I_{in}$, the DC voltage source 19 of the inverter circuit 14 is charged with energy.

Next, when the short-circuit switch 21 is turned "OFF" in the case where the phase θ is equal to θ1, as illustrated in FIG.

9, the current from the AC power supply 1 flows through a path including the diode bridge 12, the reactor 13, the inverter circuit 14, the rectifier diode 20, the smoothing capacitor 22, and the diode bridge 12 in this order, to thereby return to the AC power supply 1.

When the phase θ satisfies θ1≦θ<θ2, the inverter circuit 14 controls the current $I_{in}$ for output, under the PWM control, for example, in a combination of the case where the single-phase inverter switches 17 and 18 are turned "ON" at the same time (current flow indicated by broken line of FIG. 9) and the case where only the single-phase inverter switch 17 is turned "ON" (current flow indicated by solid line of FIG. 9). In this case, in order to be able to maintain the DC voltage $V_{dc}$ of the smoothing capacitor 22 to the target voltage $V_{dc}{}^*$, the inverter circuit 14 controls the current $I_{in}$ for output so that the input power factor is equal to substantially one or one while a voltage substantially equal to or equal to $(V_{dc}{}^*-V_{in})$ is generated. During the control of the current $I_{in}$, the polarity of the voltage generated by the inverter circuit 14 is equal to the polarity of the current $I_{in}$, and hence the DC voltage source 19 of the inverter circuit 14 is discharged.

Next, when the voltage $V_{in}$ becomes equal to the DC voltage $V_{dc}{}^*$ of the smoothing capacitor 22 at the phase θ(=θ2), the short-circuit switch 21 continues to be in the OFF state, but the operation of the inverter circuit 14 is changed.

That is, when the phase θ is θ2≦θ<π/2, as illustrated in FIG. 10, the current from the AC power supply 1 flows through a path including the diode bridge 12, the reactor 13, the inverter circuit 14, the rectifier diode 20, the smoothing capacitor 22, and the diode bridge 12 in this order, to thereby return to the AC power supply 1.

The inverter circuit 14 controls the current $I_{in}$ for output, under the PWM control, for example, in a combination of the case where the single-phase inverter switches 17 and 18 are turned "OFF" (current flow indicated by broken line of FIG. 10) and the case where only the single-phase inverter switch 18 is turned "ON" (current flow indicated by solid line of FIG. 10). In this case, the target voltage $V_{dc}{}^*$ of the smoothing capacitor 22 is equal to or smaller than the voltage $V_{in}$. Therefore, in order to be able to maintain the DC voltage $V_{dc}$ of the smoothing capacitor 22 to the target voltage $V_{dc}{}^*$, the inverter circuit 14 controls the current $I_{in}$ for output so that the input power factor is equal to substantially one or one while a voltage substantially equal to or equal to $(V_{in}-V_{dc}{}^*)$ is generated with the opposite polarity to the voltage $V_{in}$. During the control of the current $I_{in}$, the polarity of the voltage generated by the inverter circuit 14 is opposite to the polarity of the current $I_{in}$, and hence the DC voltage source 19 of the inverter circuit 14 is charged.

As illustrated in FIG. 7, during a phase period of π/2≦θ<π, an operation is symmetrical to the operation performed during the phase period of 0≦θ<π/2 described above. During a phase period of π≦θ<2π, the same operation as during the phase period of 0≦θ<π is performed.

That is, a zero cross phase "(θ=0, π)±θ1" of the phase θ of the input voltage from the AC power supply 1 is set as a specific phase to switch the short-circuit switch 21. The short-circuit switch 21 is brought into the "ON" state only in a phase range of ±θ1 relative to the zero cross phase (hereinafter, referred to as short-circuit phase range) to bypass the smoothing capacitor 22. In this case, the inverter circuit 14 controls the current $I_{in}$ for output so that the input power factor is equal to substantially one or one while a voltage which has an opposite polarity to the voltage $V_{in}$ and is substantially equal to or equal to the voltage $V_{in}$ is generated, to thereby charge the DC voltage source 19. In a phase range except the short-circuit phase range, the inverter circuit 14 maintains the DC voltage $V_{dc}$ of the smoothing capacitor 22 to the target voltage $V_{dc}{}^*$ and controls the current $I_{in}$ so that the input power factor is equal to substantially one or one, to thereby generate the voltage. In this case, when the voltage $V_{in}$ is equal to or smaller than the target voltage $V_{dc}{}^*$ of the smoothing capacitor 22, the DC voltage source 19 is discharged. When the voltage $V_{in}$ exceeds the target voltage $V_{dc}{}^*$, the DC voltage source 19 is charged.

When θ1 becomes larger, energy charged in the DC voltage source 19 increases. In subsequent discharging, a generated voltage may be superimposed on the voltage $V_{in}$ in a high-voltage range and discharged energy may be increased. Therefore, the DC voltage $V_{dc}$ (target voltage $V_{dc}{}^*$) of the smoothing capacitor 22 may be increased.

In the phase period of 0≦θ<π/2, as described above, the DC voltage source 19 of the inverter circuit 14 is charged during the periods of 0≦θ<θ1 and θ2≦θ<π/2 and discharged during the period of θ1≦θ<θ2. When charge and discharge energies of the DC voltage source 19 of the inverter circuit 14 are equal to each other, Expression (2) described below is established. Note that, $V_p$ indicates a peak voltage of the voltage $V_{in}$ and $I_p$ indicates a peak current of the current $I_{in}$.

$$\int_0^{\theta_1} V_p \sin\theta \cdot I_p \sin\theta \cdot d\theta + \int_{\theta_2}^{\pi/2}(V_p \sin\theta - V_{dc}{}^*)\cdot I_p \sin\theta \cdot d\theta = \int_{\theta_1}^{\theta_2}(V_{dc}{}^* - V_p \sin\theta)\cdot I_p \sin\theta \cdot d\theta \quad (2)$$

When $$V_{in}=V_p \sin\theta \text{ and } I_{in}=I_p \sin\theta,$$

$$V_{dc}{}^*=V_p \pi/(4\cos\theta_1)$$

is obtained. Therefore, the target voltage $V_{dc}{}^*$ of the smoothing capacitor 22 is determined based on θ1 for defining the short-circuit range, that is, the target voltage $V_{dc}{}^*$ may be controlled based on changed θ1. The DC voltage $V_{dc}$ of the smoothing capacitor 22 is controlled to follow the target voltage $V_{dc}{}^*$.

When the voltage $V_{sub}$ of the DC voltage source 19 is set to a value equal to or larger than a desired generated voltage of the inverter circuit 14 in each of the phase ranges of 0≦θ<1, θ1≦θ<θ2, and θ2≦θ<π/2, the inverter circuit 14 may perform the desired control described above with high reliability. That is, when the voltage $V_{sub}$ is set to satisfy the following three conditions, $$V_p \sin\theta_1 \leq V_{sub} \quad (3)$$

$$(V_{dc}{}^* - V_p \sin\theta_1) \leq V_{sub} \quad (4)$$

$$(V_p - V_{dc}{}^*) \leq V_{sub} \quad (5)$$

the DC voltage $V_{dc}$ of the smoothing capacitor 22 may be maintained to the target voltage $V_{dc}{}^*$. In addition, the control of the inverter circuit 14 which controls the current $I_{in}$ so that the input power factor is equal to substantially one or one may be performed with high reliability in all phases of the AC power supply 1. The voltage $V_{sub}$ of the DC voltage source 19 is set to a value equal to or smaller than the peak voltage $V_p$ of the voltage $V_{in}$.

Next, the control of the inverter circuit 14 which maintains the DC voltage $V_{dc}$ of the smoothing capacitor 22 to the target voltage $V_{dc}{}^*$ and controls the current $I_{in}$ so that the input power factor is equal to substantially one or one is described in detail below.

Figure 11:
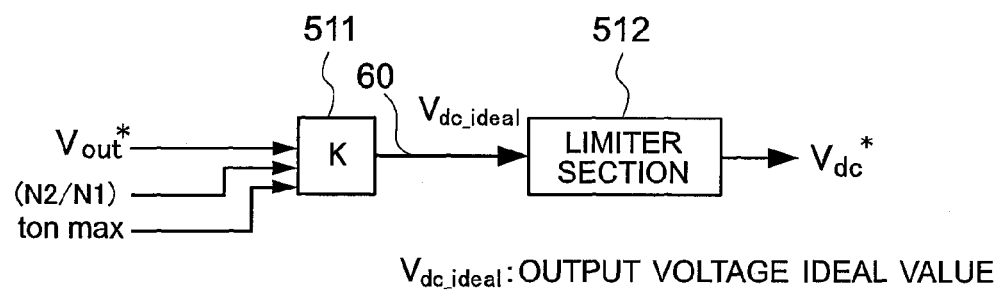
FIG. 11 is a control block diagram illustrating control of the AC/DC converter section.
Figure 12:
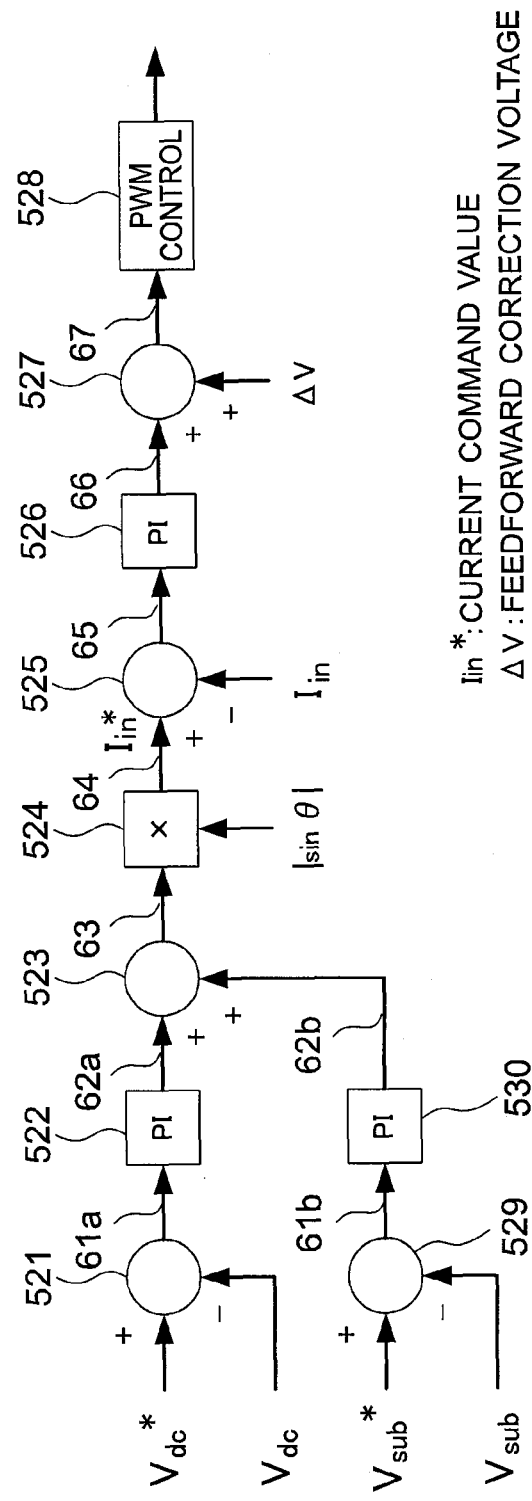
FIG. 12 is a control block diagram illustrating the control of the AC/DC converter section.

FIGS. 11 and 12 are control block diagrams illustrating the control of the AC/DC converter section 10 which is performed by the AC/DC converter control means 5b illustrated in FIG. 3. In FIG. 11, a calculation section 511 calculates a first target voltage value (output voltage ideal value) $V_{dc\_ideal}$ 60 of the DC voltage $V_{dc}$ of the smoothing capacitor 22 using Expression (1) described above based on the target voltage value $V_{out}^*$ 52 (see FIG. 6) of the output voltage $V_{out}$ of the DC/DC converter section 11, the winding ratio (N2/N1) of the transformer 24, and an ON time "ton max" of the forward converter switch 23 to maximize the efficiency of the DC/DC converter section 11.

In a limiter section 512, a range of the DC voltage $V_{dc}$ of the smoothing capacitor 22 which may be current-controlled by the AC/DC converter section 10 is calculated using Expressions (2) to (5) described above. When (first target voltage value $V_{dc\_ideal}$)<(lower limit of result obtained by calculation), the lower limit of the result obtained by the calculation is set as the target voltage value $V_{dc}^*$ of the smoothing capacitor 22 located in an output stage and the target voltage value $V_{dc}^*$ is used for a proportional term K illustrated in FIG. 11.

When (first target voltage value $V_{dc\_ideal}$)>(lower limit of result obtained by calculation), the first target voltage value $V_{dc\_ideal}$ 60 is set as the target voltage value $V_{dc}^*$ of the smoothing capacitor 22 located in the output stage.

Therefore, while the voltage $V_{sub}$ of the DC voltage source 19 of the single-phase inverter is maintained to the constant value, the AC/DC converter section 10 may perform the current control. In addition, when (first target voltage value $V_{dc\_ideal}$)>(lower limit of result obtained by calculation), the DC/DC converter section 11 may operate at a maximum efficiency point.

In FIG. 12, a difference 61a between the DC voltage $V_{dc}$ and target voltage value $V_{dc}^*$ of the smoothing capacitor 22 located in the output stage is obtained by a subtracting section 521. The difference 61 a is used as a feedback amount and a PI control output 62a obtained by PI control is calculated by a PI control section 522. In order to maintain the voltage $V_{sub}$ of the DC voltage source 19 of the inverter circuit 14 to a constant value, a difference 61b between the voltage $V_{sub}$ and the target voltage $V_{sub}^*$ is obtained by a subtracting section 529. The difference 61b is used as a feedback amount and a PI control output 62b obtained by PI control is calculated by a PI control section 530. The PI control outputs 62a and 62b are added to each other by an adding section 523 to determine an amplitude target value 63 of the current $I_{in}$. A multiplying section 524 generates a sinusoidal current command value $I_{in}^*$ 64 synchronized with the voltage $V_{in}$ in accordance with the amplitude target value 63.

Then, a difference 65 between the sinusoidal current command value $I_{in}^*$ 64 and the detected current $I_{in}$ is obtained by a subtracting section 525. The difference 65 is used as a feedback amount and an output obtained by PI control by a PI control section 526 is set as a voltage command value 66 corresponding to a target value of the generated voltage of the inverter circuit 14. In this case, a feedforward correction voltage $\Delta V$ synchronized with the ON/OFF switching of the short-circuit switch 21 is added to the voltage command value 66 by an adding section 527 to correct the voltage command value 66. A voltage command value 67 obtained by correction is used to generate driving signals for the single-phase inverter switches 17 and 18 of the inverter circuit 14 by the PWM control of a PWM control section 528, to thereby operate the inverter circuit 14.

In a specific phase of the zero cross phase "($\theta=0, \pi$)±$\theta 1$" of the input voltage from the AC power supply 1, the ON/OFF switching of the short-circuit switch 21 is performed. In the inverter circuit 14, when the short-circuit switch 21 is changed from "ON" to "OFF", the control for charging the DC voltage source 19 is switched to the control for discharging the DC voltage source 19. When the short-circuit switch 21 is changed from "OFF" to "ON", the control for discharging the DC voltage source 19 is switched to the control for charging the DC voltage source 19. As described above, the feedforward correction voltage $\Delta V$ synchronized with the ON/OFF switching of the short-circuit switch 21 is added to the voltage command value 66 to correct the voltage command value 66, and hence the control may be prevented from being delayed by a feedback control response time.

That is, in FIGS. 8 to 10, current paths formed based on combinations of the PWM control of the inverter circuit and the control of the short-circuit switch are described. In FIG. 11, the method of determining the output voltage of the AC/DC converter section (voltage across smoothing capacitor 22) $V_{dc}$ is described. The ON/OFF timing of the short-circuit switch is determined by calculating $\theta 1$ from "$V_{dc}^*=V_p \cdot \pi/(4 \cos \theta 1)$" based on $V_{dc}^*$ obtained in FIG. 11. In FIG. 12, how to PWM-control the inverter circuit is described. In this case, the feedforward correction voltage $\Delta V$ is changed by the ON/OFF switching of the short-circuit switch.

Figure 13A:
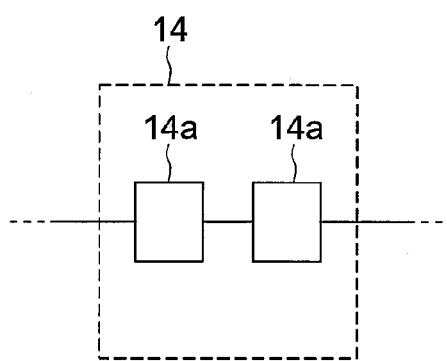
FIGS. 13A and 13B illustrate modified examples of the structure of the power conversion circuit in the present invention.
Figure 13B:
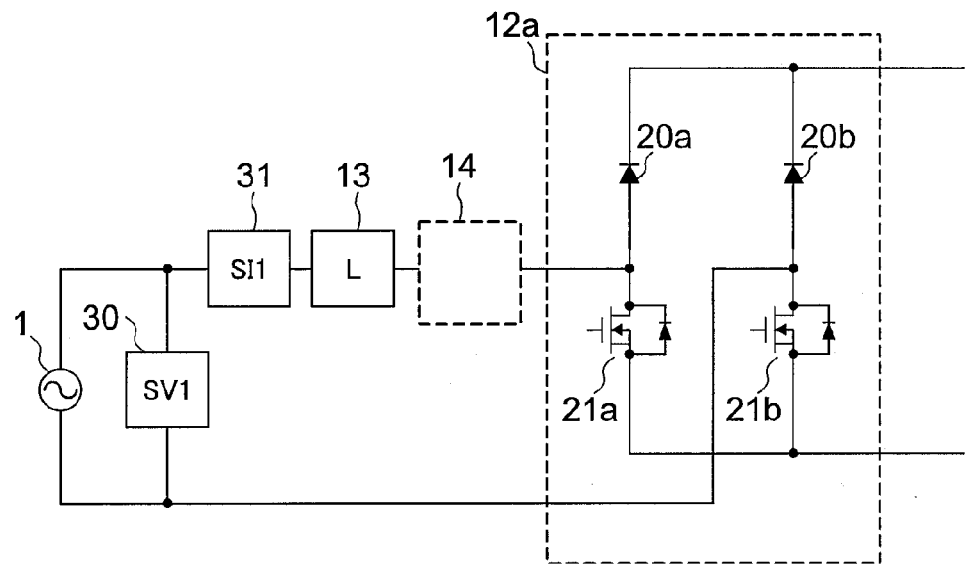

The AC/DC converter section 10 in this embodiment is an example of the AC/DC converter section 10 including the inverter circuit 14 which has the plurality of semiconductor switching elements and the DC voltage source. The inverter circuit 14 is controlled in accordance with the current command value $I_{in}^*$ to cause the voltage $V_{dc}$ of the smoothing capacitor 22 to follow the target voltage value $V_{dc}^*$ and improve the input power factor from the AC power supply 1. However, the present invention is not limited to the structure described above. The inverter circuit 14 may have a structure in which a plurality of single-phase inverters 14a are connected in series as schematically illustrated in FIG. 13A. As schematically illustrated in FIG. 13B, the diode bridge 12 located closest to the input side may be removed and a plurality of series circuits including a set of short-circuit switch 21a and rectifier diode 20a and a set of short-circuit switch 21b and rectifier diode 20b may be provided in a subsequent stage of the inverter circuit 14. Even when a structure including a rectifier circuit 12a using the rectifier diodes 20a and 20b is provided, the same effect is obtained.

Second Embodiment

Figure 14:
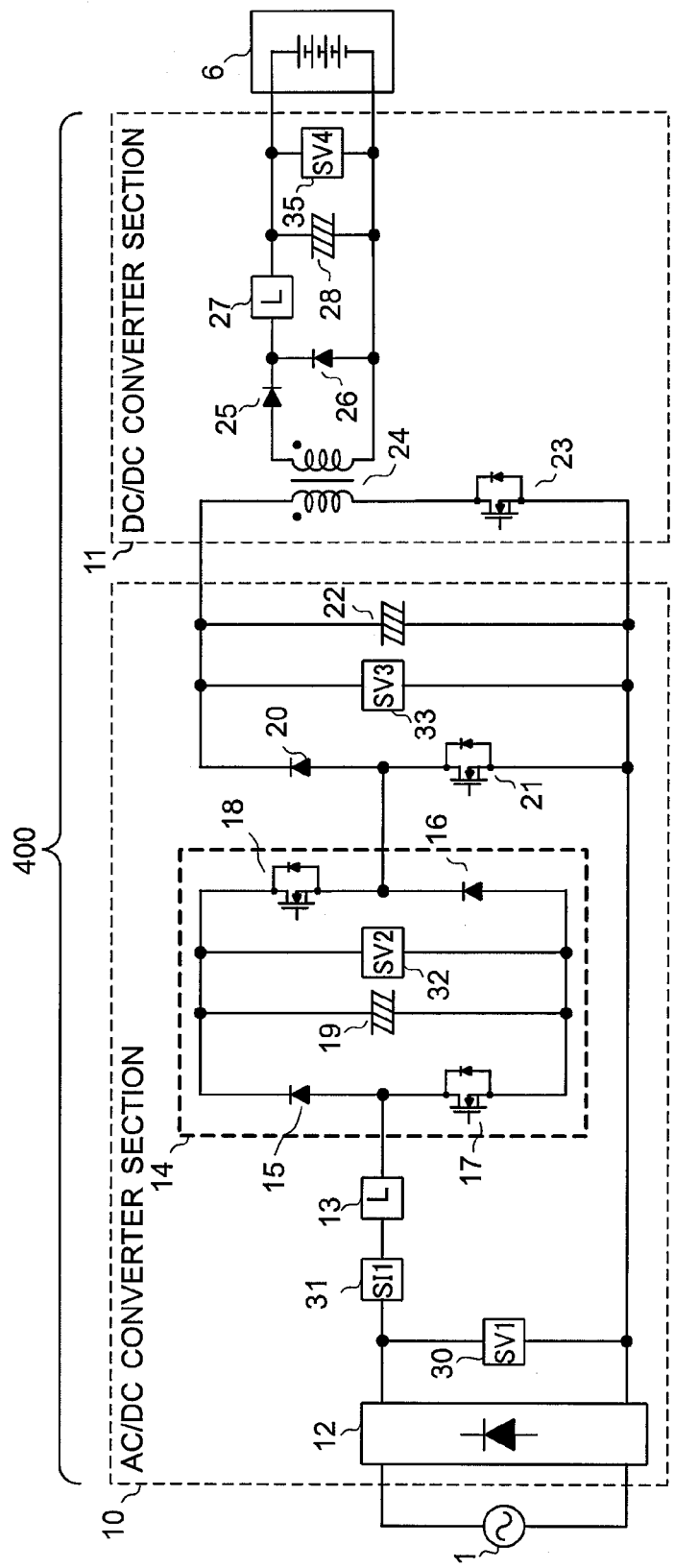
FIG. 14 is a schematic structural diagram illustrating an example of an internal structure of a power conversion circuit in a second embodiment of the present invention.

FIG. 14 is a schematic structural diagram illustrating an example of the internal structure of the power conversion circuit 400 illustrated in FIG. 1 in a second embodiment of the present invention. The entire structure of the power conversion apparatus is the same as the structure illustrated in FIG. 1. The structure illustrated in FIG. 14 is different from the structure illustrated in FIG. 2 (first embodiment) in that the output current detection circuit 34 is omitted. The control of the control section 5 for causing the output current to follow the target current value $I_{out}^*$ in the structure illustrated in FIG. 14 is described in detail below.

Symbols are defined as follows.

$P_{in}$: input power from AC power supply 1

$I_{out}^*$: control target current value of output current $I_{out}$

Figure 15:
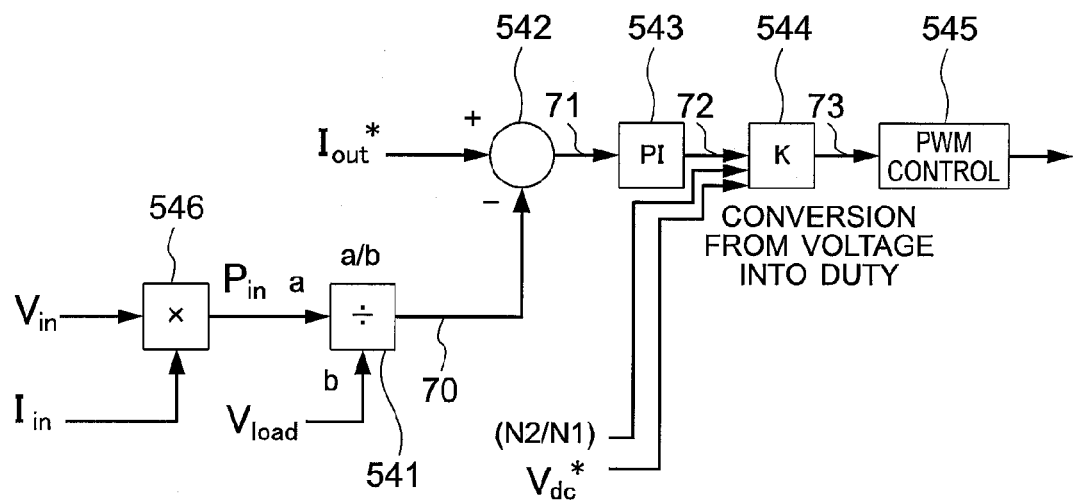
FIG. 15 is a control block diagram illustrating control of a forward converter switch illustrated in FIG. 14.

FIG. 15 is a control block diagram illustrating control of the forward converter switch 23 which is performed by the DC/DC converter control means 5a illustrated in FIG. 3. Firstly, the input power $P_{in}$ is divided by the load voltage $V_{load}$ by a dividing section 541 to obtain an output current estimated value 70. The input power $P_{in}$ is input power obtained by a multiplying section 546 based on the voltage $V_{in}$ detected by the rectified voltage detection circuit 30 and the current $I_{in}$ detected by the rectified current detection circuit 31.

Next, a difference 71 between the output current estimated value 70 and the target current value $I_{out}^*$ is obtained by a subtracting section 542. Then, the difference 71 is used as a feedback amount and an output obtained by PI control by a PI control section (PI) 543 is set as a target voltage value $V_{out}^*$ 72 of the output voltage $V_{out}$ of the DC/DC converter section 11. A PWM duty 73 for generating the target voltage value $V_{out}^*$ 72 of the output voltage $V_{out}$ is obtained by a duty calculation section (K) 544 using Expression (1) described above based on the winding ratio (N2/N1) of the transformer 24 and the target voltage value $V_{dc}^*$ of the DC voltage $V_{dc}$ of the smoothing capacitor 22. A driving signal for the forward converter switch 23 is generated by a PWM control section 545 based on the PWM duty 73 to operate the DC/DC converter section 11.

Figure 16:
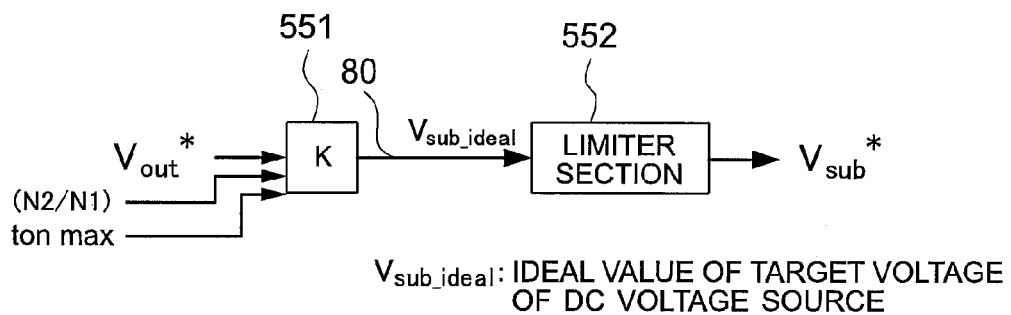
FIG. 16 is a control block diagram illustrating control of the AC/DC converter section.

FIG. 16 is a control block diagram illustrating control of the AC/DC converter section 10 which is performed by the AC/DC converter control means 5b illustrated in FIG. 3. FIG. 16 illustrates a method of calculating the target voltage value $V_{sub}^*$ of the voltage $V_{sub}$ of the DC voltage source. Firstly, a calculation section 551 calculates a first target voltage value (DC voltage source target voltage ideal value) $V_{sub\_ideal}$ 80 of the DC voltage source 19 using Expressions (3) to (5) described above based on the target voltage value $V_{out}^*$ 52 (see FIG. 6) of the output voltage $V_{out}$ of the DC/DC converter section 11, the winding ratio (N2/N1) of the transformer 24, and the ON time "ton max" of the forward converter switch 23 to maximize the efficiency of the DC/DC converter section 11.

Next, in a limiter section 552, a withstand voltage of a single-phase inverter switching element is used as a condition. When $(V_{sub\_ideal})$>(withstand voltage of switching element), the target voltage $V_{sub}^*$ of the DC voltage source 19 is set as the withstand voltage of the switching element. When $(V_{sub\_ideal})$<(withstand voltage of switching element), the target voltage $V_{sub}^*$ of the DC voltage source 19 is set as $V_{sub\_ideal}$.

When the control (FIG. 11) described in the first embodiment and the control (FIG. 12) using $V_{sub}^*$ illustrated in FIG. 16 are employed, the target voltage value $V_{sub}^*$ of the DC voltage source of the single-phase inverter may be controlled to enable the current control of the AC/DC converter section 10 and maintain a minimum voltage in a range equal to or smaller than the withstand voltage of the switching element of the single-phase inverter.

The control section 5 has the control for changing the DC voltage of the single-phase inverter of the inverter circuit 14 in a range equal to or smaller than the withstand voltage of the semiconductor switching element in order to enable the current control of the AC/DC converter section 10 and the control for changing the target voltage of the DC output voltage of the AC/DC converter section 10 in accordance with the voltage of the AC power supply 1, and performs the former control with higher priority than the latter control.

Figure 17:
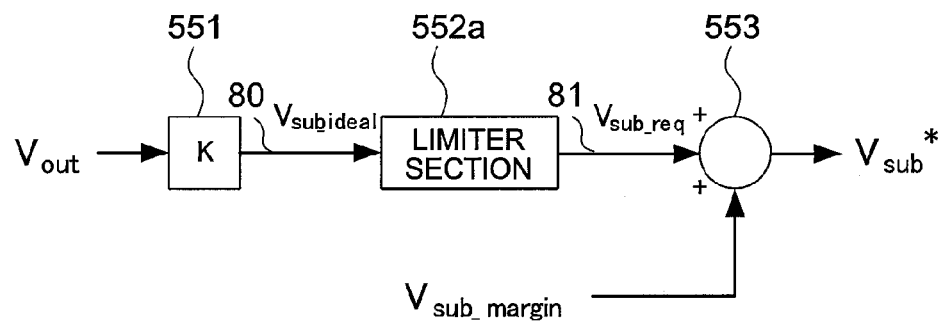
FIG. 17 is a control block diagram illustrating another control of the AC/DC converter section.

In this embodiment, the target voltage value $V_{sub}^*$ of the DC voltage source 19 is calculated based on the first target voltage value $V_{sub\_ideal}$ 80 of the DC voltage source 19 and the withstand voltage of the switching element. However, the following control may be performed. As illustrated in FIG. 17, a limiter section 552a calculates a second target voltage value $V_{sub\_req}$ 81 of the DC voltage source 19 to enable the current control of the AC/DC converter section 10 using Expressions (3) to (5) described above based on the first target voltage value $V_{sub\_ideal}$ 80 of the DC voltage source 19. An adding section 553 adds a preset margin coefficient $V_{sub\_margin}$ to the second target voltage value $V_{sub\_req}$ 81 of the DC voltage source 19 in order to enable the current control of the AC/DC converter section 10 even when the DC voltage $V_{dc}$ of the smoothing capacitor 22 or the input voltage from the AC power supply 1 is pulsated, to thereby perform the control based on the target voltage value $V_{sub}^*$ of the DC voltage source. Therefore, the reliability of the current control of the AC/DC converter section 10 is improved.

In the embodiment described above, the example is described in which the margin coefficient $V_{sub\_margin}$ is added to the second target voltage value $V_{sub\_req}$ of the DC voltage source. However, the margin coefficient may be added to the DC voltage $V_{dc}$ of the smoothing capacitor 22 or the input voltage $V_{in}$ from the AC power supply 1 and then the second target voltage value $V_{sub\_req}$ of the DC voltage source may be calculated to set $V_{sub\_req}$ as the target voltage value $V_{sub}^*$ of the DC voltage source.

The control section 5 may control the power conversion circuit 400 described above in accordance with an effective value of the AC voltage from the AC power supply 1.

The DC/DC converter section 11 of the power supply apparatus 200 described in each of the embodiments as an example includes the general forward converter circuit. However, another DC/DC converter circuit may be provided. The control method is not limited to the examples described above.

In each of the embodiments, the power supply apparatus (power conversion apparatus) 200 includes the AC/DC converter section 10 and the DC/DC converter section 11. However, the present invention is not limited to this structure. The power supply apparatus may include any output control circuit using a switching element.

The structure of the power supply apparatus 200 is not limited to the structure illustrated in FIG. 1. For example, the power converter 300 may have the function of the electric control device 7. To be specific, for example, the electric control device 7 may be incorporated in the control section 5.

Not only the single-phase inverter switches 17 and 18 but also the short-circuit switch 21 and the forward converter switch 23 may be semiconductor switches including IGBTs or MOSFETs.

The power conversion apparatus according to the present invention is not limited to the respective embodiments described above and all possible combinations of the embodiments may be made.

What is claimed is:

1. A power conversion apparatus, comprising:
   an AC/DC converter section for converting AC power from an AC power supply into DC power;
   a DC/DC converter section for converting an output from said AC/DC converter section into predetermined DC power for output; and
   a control section for performing switching control on switches provided at predetermined parts in accordance with detection signals input from a voltage detection circuit and a current detection circuit provided at predetermined parts of said AC/DC converter section and a voltage detection circuit and a current detection circuit provided at predetermined parts of said DC/DC converter section,
   wherein said AC/DC converter section includes:
      an inverter circuit in which at least one single-phase inverter having a DC voltage source and a plurality of semiconductor switching elements for charging and discharging the DC voltage source is connected in series;
      a rectifier element provided in a subsequent stage of said inverter circuit;
      a smoothing capacitor which is connected to said inverter circuit through said rectifier element, for smoothing an output from said inverter circuit for output; and a short-circuit switch for causing a current to bypass said smoothing capacitor, and wherein said control section controls a current input to said inverter circuit to cause a DC output voltage from said AC/DC converter section which is a voltage across said smoothing capacitor to follow a target voltage and to cause an input power factor from the AC power supply to approach one, to thereby maintain a DC voltage from the at least one single-phase inverter, and adjusts the target voltage for the DC output voltage from said AC/DC converter section in accordance with a voltage of the AC power supply.

2. The power conversion apparatus according to claim 1, wherein said control section has first control for adjusting the DC voltage from the at least one single-phase inverter in a range equal to or smaller than a withstand voltage of the plurality of semiconductor switching elements to enable current control of said AC/DC converter section and second control for adjusting the target voltage for the DC output voltage from said AC/DC converter section in accordance with the voltage of the AC power supply, and performs said first control with higher priority than said second control.

3. The power conversion apparatus according to claim 2, wherein said first control comprises adjusting a target voltage of the DC voltage from the at least one single-phase inverter to enable the current control of said AC/DC converter section in accordance with the DC output voltage from said AC/DC converter section, the voltage of the AC power supply, and a margin coefficient added to the voltage of the AC power supply and the DC output voltage from said AC/DC converter section.

4. The power conversion apparatus according to claim 1, wherein said control section controls the DC output voltage from said AC/DC converter section in accordance with an effective value of an AC voltage.

5. The power conversion apparatus according to claim 2, wherein said control section controls the DC output voltage from said AC/DC converter section in accordance with an effective value of an AC voltage.

* * * * *